June 26, 1962 H. L. MENDENHALL ET AL 3,040,833
SEISMIC EXPLORATION
Filed Jan. 14, 1957 3 Sheets-Sheet 1

INVENTORS
H. L. MENDENHALL
S. D. ELLIOTT
BY Hudson & Young
ATTORNEYS

INVENTORS
H.L. MENDENHALL
S.D. ELLIOTT
BY Hudson & Young
ATTORNEYS

June 26, 1962  H. L. MENDENHALL ET AL  3,040,833
SEISMIC EXPLORATION
Filed Jan. 14, 1957  3 Sheets—Sheet 3

INVENTORS
H.L. MENDENHALL
S.D. ELLIOTT
BY
Hudson & Young
ATTORNEYS 3,040,833
SEISMIC EXPLORATION
Harold L. Mendenhall and Sam D. Elliott, Bartlesville, Okla., assignors to Phillips Petroleum Company, a corporation of Delaware
Filed Jan. 14, 1957, Ser. No. 633,921
3 Claims. (Cl. 181—.5)

This invention relates to a method of seismic exploration wherein a plurality of separate vibration records obtained from a common subterranean reflection point or area are added in a manner so as to amplify the desired primary reflections and minimize all other vibrations.

Seismic exploration relates to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot hole. The vibrations incident upon the seismometers are converted into counterpart electrical signals which are amplified and recorded. By timing the arrivals of selected reflections, valuable information can often be obtained regarding the depth and slope of subterranean earth formations. Unfortunately, however, other vibrations normally are present which tend to obscure the recognition of the desired reflected signals. In order to minimize these vibrations, a number of systems have been proposed which include electrical tuning networks and selected spacings of the vibration pickups. However, there are still large sections of the country wherein it is impossible to obtain accurate information of subterranean formations because of the noise vibrations.

The present invention relates to an improved method of seismic exploration which involves recording a plurality of vibration signals from a common point or a common area in a subterranean formation. The individual reflected signals are recorded separately at the surface of the earth. These signals are then superimposed upon one another in such a fashion that the desired reflections are added, whereas the noise vibrations tend to cancel one another so that the composite signal contains a maximum peak representative of the reflections. The several signals are obtained by detonating a plurality of explosive charges in sequence in spaced shot holes along a common line. A plurality of seismometers are disposed along this common line on both sides of each shot hole. In this manner, it is possible to obtain a maximum number of recordings forom each shot point.

Accordingly, it is an object of this invention to provide a method of recording and reproducing seismic signals in such a manner as to amplify the desired reflections and minimize noise vibrations.

Another object is to provide a method of seismic exploration which comprises establishing vibrations sequentially from a plurality of spaced first points near the surface of the earth which lie along a common line and recording vibrations received at a plurality of selected second points which are positioned on the same line on both sides of each of the first points.

Other objects, advantages and features of the invention should become apparent from the following detailed description which is taken in conjunction with the accompanying drawings in which:

FIGURE 5 is a schematic view of a plurality of seismometers at a common location.

Figure 1:
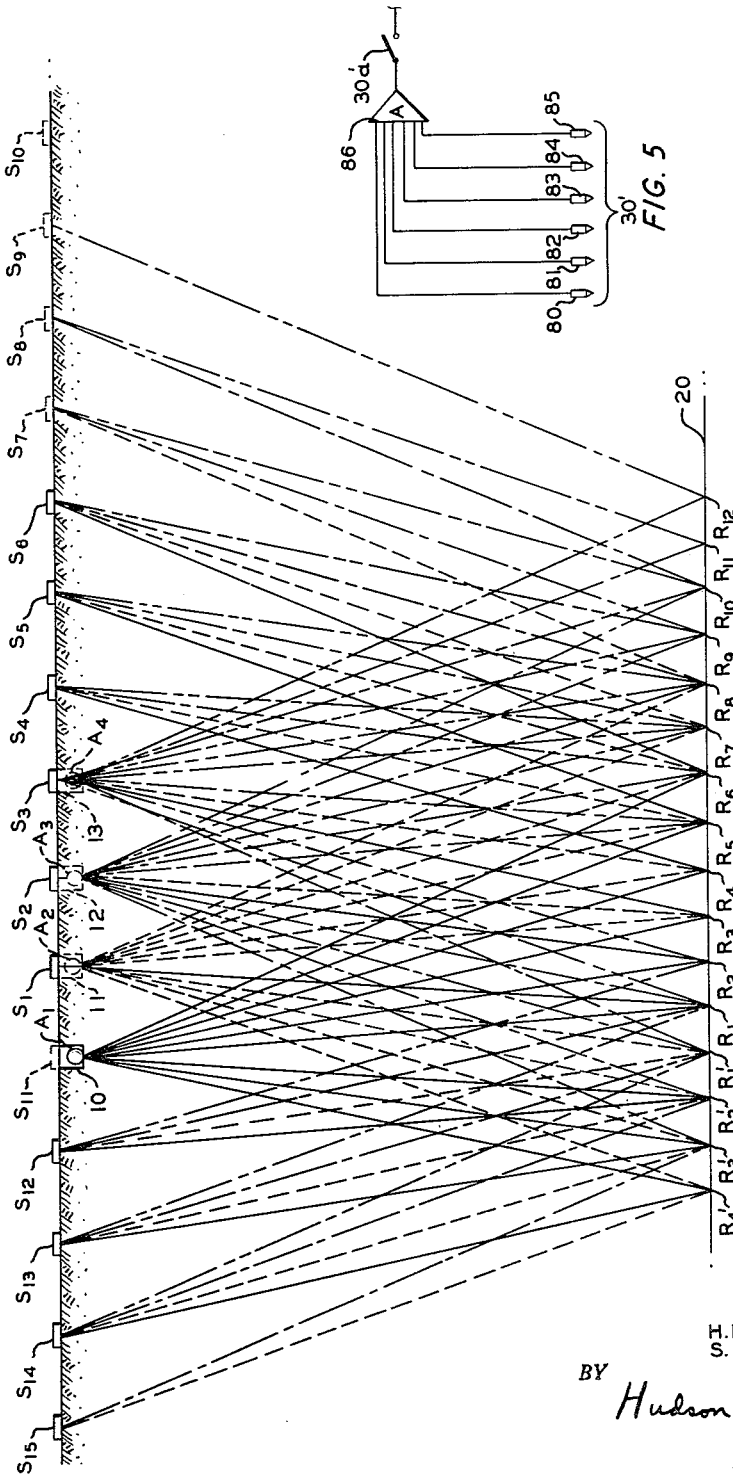
FIGURE 1 is a schematic representation of the locations of the shot points and seismometers employed in carrying out the method of this invention.

Referring now to the drawing in detail and to FIGURE 1 in particular, there is shown a schematic representation of field procedure employed in the seismic exploration system of this invention. Vibrations are established at a first point near the surface of the earth by detonating an explosive charge $A_1$ in a shot hole 10. A plurality of seismometers $S_1$, $S_2$, $S_3$, $S_4$, $S_5$, and $S_6$ are positioned near the surface of the earth along a common line. These seismometers are spaced equal distances from one another. Second seismometers $S_{12}$, $S_{13}$, and $S_{14}$ are positioned along the same line in spaced relationship with one another on the opposite side of shot hole 10. These seismometers can represent individual vibration responsive transducing elements, or they can represent a plurality of such elements grouped together, as is conventional in the seismic exploration art. When a plurality of seismometers are located at or near a common point, the outputs are summed to give a single signal. These seismometers preferably are of the type which convert mechanical vibrations incident thereon into counterpart electrical signals. These signals are amplified and recorded in the manner described hereinafter in detail. In FIGURE 1, reference numeral 20 designates a subterranean reflecting bed which is substantially horizontal. Under these conditions, it should be evident that seismometers $S_1$, $S_2$, $S_3$, $S_4$, $S_5$, $S_6$, $S_{12}$, $S_{13}$, and $S_{14}$ receive vibrations that are reflected from bed 20 at points $R_1$, $R_2$, $R_3$, $R_4$, $R_5$, $R_6$, $R_1'$, $R_2'$, and $R_3'$, respectively.

A second explosive charge $A_2$ is then detonated in a shot hole 11 which is located adjacent original seismometer $S_1$. Additional seismometers are positioned at locations $S_7$ and $S_{15}$. It should be evident that vibrations are received at seismometers $S_2$, $S_3$, $S_4$, $S_5$, $S_6$, $S_7$, $S_{11}$, $S_{12}$, $S_{13}$, $S_{14}$, and $S_{15}$ which are reflected from points $R_3$, $R_4$, $R_5$, $R_6$, $R_7$, $R_8$, $R_1$, $R_1'$, $R_2'$, $R_3'$, and $R_4'$, respectively, on bed 20. Third and fourth explosive charges $A_3$ and $A_4$ are then detonated in sequence in respective shot holes 12 and 13. Vibrations are received at six seismometers on each side of the respective shot holes in the manner illustrated. This procedure is continued with explosive charges being detonated in shot holes at locations illustrated by seismometers $S_4$, $S_5$, $S_6$, etc. Six seismometers are located on each side of the shot holes merely for the purpose of simplifying the explanation.

Figure 2:
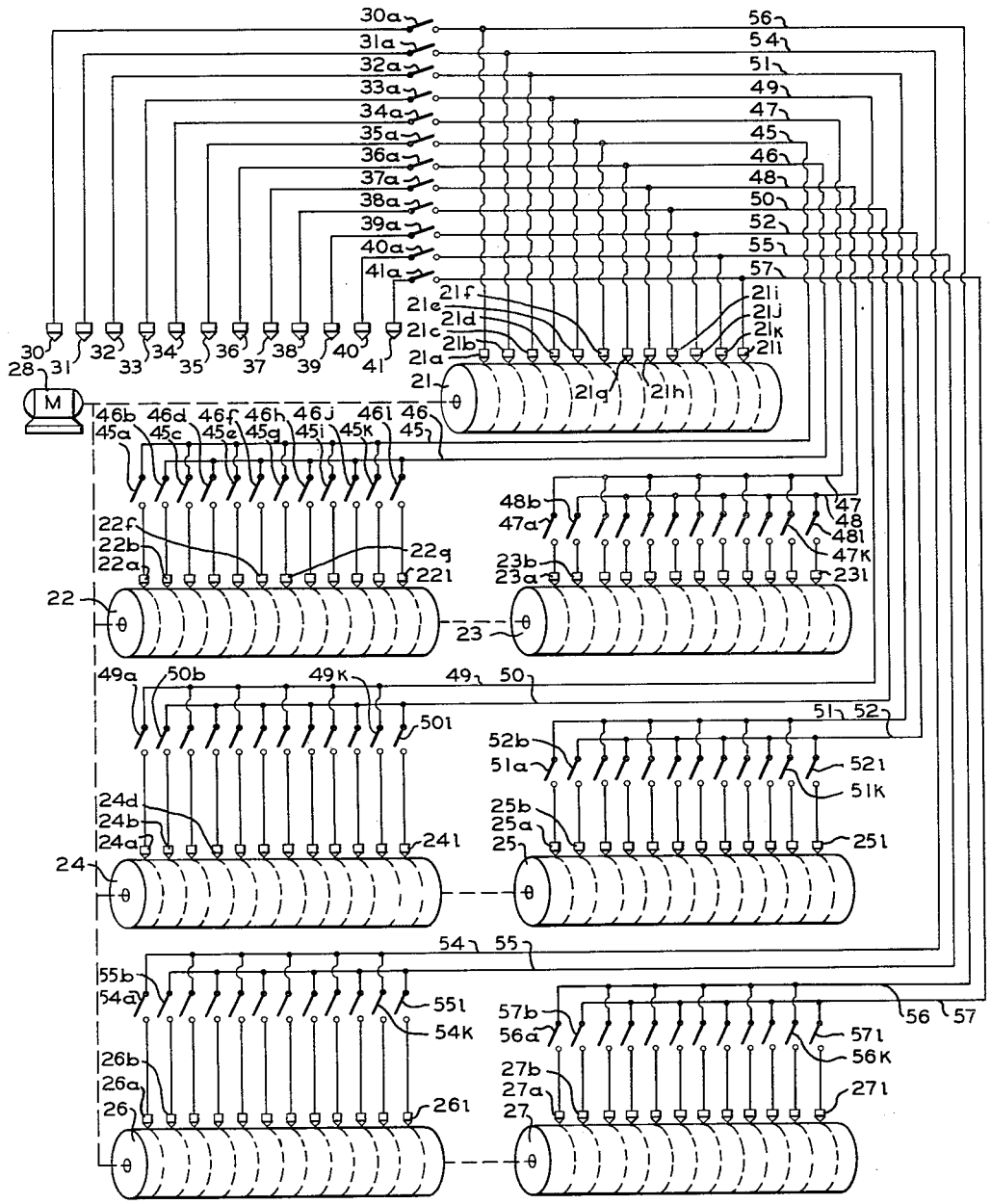
FIGURE 2 is a schematic representation of recording and reproducing apparatus which is employed in conjunction with the seismic system of FIGURE 1.

The recording apparatus employed to carry out this invention is illustrated in FIGURE 2. A plurality of drums 21, 22, 23, 24, 25, 26, and 27 are rotated in unison by a motor 28. Magnetic recording tapes are mounted on each of these drums and a plurality of recording heads are positioned in spaced relationship adjacent each of the drums. For example, recording heads 21a, 21b, 21c, 21d, 21e, 21f, 21g, 21h, 21i, 21j, 21k, and 21b are mounted adjacent drum 21. Similar recordings heads are mounted adjacent each of the remaining drums 22, 23, 24, 25, 26, and 27. A plurality of seismometers, or group of seismometers, 30 to 41 are illustrated in FIGURE 2. These seismometers are connected through respective switches 30a, 31a, . . . 41a to recording heads 21a, 21b, . . . 21l of drum 21. In this manner, the signals received by the twelve seismometers are recorded on respective channels of magnetic drum 21 when the switches are closed. At the time the first explosive charge is detonated in shot hole 10, seismometers 36, 37, 38, 39, 40, 41, 35, 34, and 33 of FIGURE 2 represent seismometers $S_1$, $S_2$, $S_3$, $S_4$, $S_5$, $S_6$, $S_{12}$, $S_{13}$, and $S_{14}$, respectively, of FIGURE 1. The vibrations received by these several seismometers are thus recorded on drum 21. It should be evident that the recording system is shown only schematically in FIGURE 2. In actual practice, it is customary to employ amplifiers between the seismometers and their recording heads. Amplitude modulation, pulse width modulation, and frequency modulation recording systems can also be utilized to advantage to make the initial recordings.

The recording heads associated with drum 21 are adjustably mounted with respect to that drum so that the signals can subsequently be reproduced in any desired time relationship. Recording heads 21a, 21b, 21c, 21d, 21e, 21f, 21g, 21h, 21i, 21j, 21k, and 21l of drum 21 are connected to electrical leads 56, 54, 51, 49, 47, 45, 46, 48, 50, 52, 55, and 57, respectively. Leads 45 and 46 terminate adjacent drum 22; leads 47 and 48 terminate adjacent drum 23; leads 49 and 50 terminate adjacent drum 24; leads 51 and 52 terminate adjacent drum 25; leads 54 and 55 terminate adjacent drum 26; and leads 56 and 57 terminate adjacent 27. Lead 45 is connected through switches 45a, 45c, 45e, 45g, 45i, and 45k to respective recording heads 22a, 22c, 22e, 22g, 22i, and 22k of drum 22. Lead 46 is connected through switches 46b, 46d, 46f, 46h, 46j, and 46l to respective recording heads 22b, 22d, 22f, 22h, 22j, and 22l of drum 22. The electrical leads associated with drum 23, 24, 25, 26, and 27 are connected through corresponding switches to the recording heads associated with these drums.

As previously mentioned, seismometers 33, 34, 35, 36, 37, 38, 39, 40, and 41 of FIGURE 2 represent seismometers $S_{14}$, $S_{13}$, $S_{12}$, $S_1$, $S_2$, $S_3$, $S_4$, $S_5$, and $S_6$, respectively, of FIGURE 1 at the time explosive charge $A_1$ is detonated in shot hole 10. The signals received by these seismometers are recorded on respective channels of drum 21. The switches between the seismometers and drum 21 are then opened and the signals originally recorded on drum 21 are transferred to the remaining drums. For example, the signals originally recorded on drum 21 by recording heads 21f and 21g are recorded on drum 22 by respective recording heads 22a and 22b. This is accomplished by rotating the drum 21 under heads 21f and 21g which then serve as reproducing heads. Switches 45a and 46b are closed at this time. In like manner, signals originally recorded on drum 21 by heads 21e and 21h are recorded on drum 23 by heads 23a and 23b. Switches 47a and 48b are closed at this time. All of the signals originally recorded on drum 21 are thus transferred to respective ones of the second drums in this same manner. When the second explosive charge is detonated in shot hole 11, seismometers 31 to 41 of FIGURE 2 represent respective seismometers $S_{15}$, $S_{14}$, $S_{13}$, $S_{12}$, $S_{11}$, $S_2$, $S_3$, $S_4$, $S_5$, $S_6$, and $S_7$ of FIGURE 1. These second signals are recorded on drum 21 and subsequently reproduced on the remaining drums. For example, the signals originally recorded by heads 21f and 21g are recorded on drum 22 by means of respective recording heads 22c and 22d. Switches 45c and 46d are closed at this time. The same operation is repeated for each of the adjacent shot holes.

Figure 4:
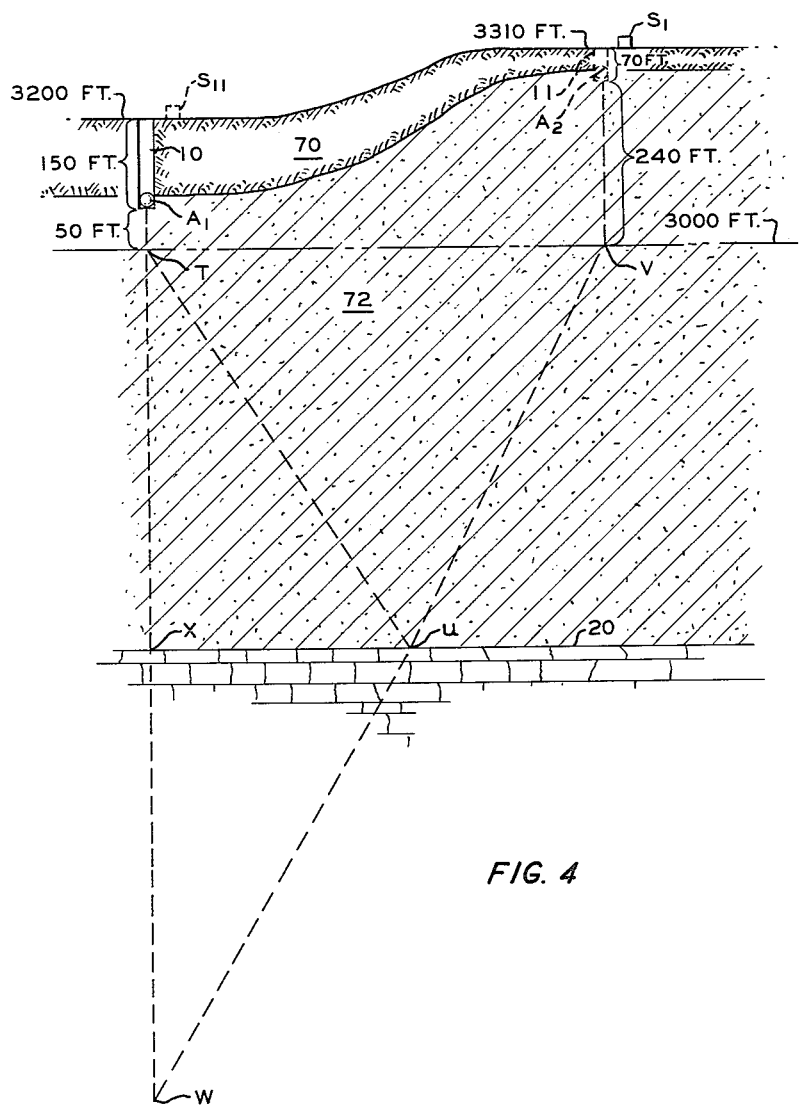
FIGURE 4 is a graphical representation of operating features of the method of this invention.

In accordance with the present invention, signals representing reflections from a common subterranean point are combined with one another so that the amplitudes of the reflections are added, whereas the noise vibrations tend to cancel one another. With reference to FIGURE 1, it can be seen that a plurality of reflections are received from point $R_1$ on bed 20, for example. These reflections include the vibrations emitted from shot points $A_1$, $A_2$, $A_3$, and $A_4$ which are received at respective seismometers $S_1$, $S_{11}$, $S_{12}$, and $S_{13}$. The signals representing these reflections are combined in accordance with the present invention by reproducing these corresponding signals from the several secondary drums simultaneously. This requires that the signals originally recorded on these secondary drums be displaced with respect to one another so as to compensate for weathering and elevation corrections. These factors are illustrated schematically in FIGURE 4, and are computed by means conventional to the art of seismic prospecting such as "up-hole time corrections" or "first break refraction weathering computations."

For example, in order to compensate for elevation corrections, all calculations are made from a common reference elevation, such as the illustrated 3000 feet elevation plane. It is common practice to detonate the explosive charges beneath the weathered layer 70 which normally is at or near the surface of the earth. For purposes of illustration it will be assumed that shot hole 10 is 150 feet deep, the velocity of sound in formation 72 is approximately 10,000 feet per second, seismometer $S_{11}$ is at an elevation of 3,200 feet, and a signal is received at seismometer $S_{11}$ approximately 0.040 second after detonation of explosive charge $A_1$. Seismometer $S_{11}$ has been omitted from the previous description in order to simplify the explanation of this invention. The record of seismometer $S_{11}$ can be obtained from an additional channel on drum 21. It is further assumed that explosive charge $A_2$ is later detonated in shot hole 11 at an elevation of 3,240 feet, which is 70 feet below seismometer $S_1$, and that a signal is received at seismometer $S_1$ approximately 0.024 second after detonation of charge $A_2$. It is still further assumed that the depth of formation 20 is large compared to the distance between seismometer $S_{11}$, and $S_1$, which can be 300 feet, for example. It is ultimately desired to determine the slope of bed 20 and the distance TX that formation 20 is below reference point T on the reference elevation plane. This distance TX is a function of the time $t$ of travel of a signal from point T to point U to point V. The time for a signal to travel from charge $A_1$ to point T and from point V to seismometer $S_1$ must be added to time $t$. If the distance TX is large compared to the distance TV, which has been assumed, the angle from charge $A_1$ to T to U is approximately 180°, as is the angle from U to V to seismometer $S_1$. The time for the signal to travel from $A_1$ to T is equal to 50 feet divided by 10,000 feet per second or 0.005 second. The time for the signal to travel from V to $A_2$ is 240 feet divided by 10,000 feet per second or 0.024 second. This gives a total weathering and elevation correction of 0.005 second plus 0.024 second plus 0.024 second, which is equal to 0.053 second. Similar corrections can be computed at each shot point. The velocities through formation 72 normally are obtained from a deep test shot hole. When recorded signals from different shot points are reproduced together, the signals must be displaced from one another by times representative of the differences between the elevation and weathering corrections. These corrections are made at the time the signals are transferred from drum 21 to one of the other drums. The several recording and reproducing heads associated with drum 21 are adjustably mounted so that they can be positioned at different points on the circumference of the drum. In this manner, the signals reproduced from drum 21 are recorded on the other drums at such times as to compensate for the weathering and elevation corrections herein described.

A second important correction which must be made when the signals are combined is to compensate for differences in angularity of path. It should be evident that the signal reflected at point $R_1$ from charge $A_1$ travels a shorter distance in reaching seismometer $S_1$ than does the signal which is reflected from the same point but which originates at charge $A_3$ and is received at seismometer $S_{12}$. In order that the signals may be combined in such a manner that the reflections reinforce one another and the noise vibration cancel, the signals must be delayed with respect to one another so that the common reflections appear simultaneously before compositing. In practice, the depth TX can arbitrarily be estimated and corresponding spread corrections computed for each shot point from a knowledge of the horizontal distance between the shot point and the associated seismometer. The recorded signals can then be reproduced together with this computed time difference to form a composite record. If the distance TX is estimated nearly correctly, then peak output signals are obtained. This procedure can be repeated for a number of estimated depths and slope of bed 20 until the signals are most nearly superimposed. When the signals are superimposed in this manner, a maximum peak is obtained which is representative of the depth and slope of the reflecting bed.

From an inspection of FIGURE 2 in view of the previous discussion, it can be seen that the signals having corresponding path lengths are recorded on corresponding drums 22 to 27. The signals received at the seismometers adjacent each shot hole are recorded on drum 22. Similarly, the signals received at the seismometers spaced twice this distance from the shot holes are recorded on drum 23. Drums 24, 25, 26, and 27 contain the signals received at seismometers spaced progressively greater distances from the shot points. The recording and reproducing heads associated with each of these drums can be positioned in unison on the circumference of the drums, or the drums can be rotated about the shafts, to incorporate corrections representative of differences in travel paths of the recorded signals.

Figure 3:
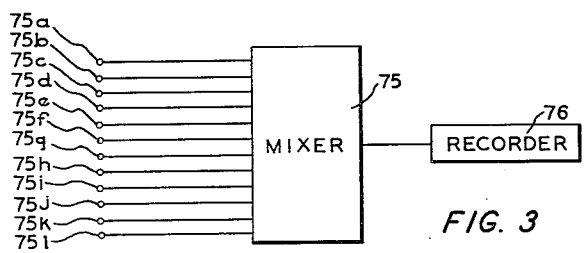
FIGURE 3 is a schematic view of apparatus employed to combine individual signals.

The signals can be recombined to produce a composite record by means of the apparatus illustrated in FIGURE 3. A mixer circuit 75 is provided with twelve input terminals 75a, 75b, . . . 75l. Normally, only six of these input terminals are required in order to combine the records as previously described. The output of mixer circuit 75 is connected to the input of a recorder 76, which can be a photographic or magnetic recorder. The compositing process should now be evident from an inspection of FIGURE 2. Reflections from point $R_5$ on bed 20 are considered by way of example. When explosive charge $A_1$ is detonated, reflections from point $R_5$ are received at seismometer location $S_5$. This is represented by seismometer 40 in FIGURE 2. The signals received by this seismometer are reproduced on drum 26 by recording head 26b. When explosive charge $A_2$ is detonated, reflections from point $R_5$ are received at seismometer location $S_4$, which corresponds to seismometer 38 of FIGURE 2. This signal is reproduced on drum 24 by recording head 24d. When explosive charge $A_3$ is detonated, reflections from point $R_5$ are received at seismometer location $S_3$, which corresponds to seismometer 36 of FIGURE 2. This signal is reproduced on drum 22 by recording head 22f. When explosive charge $A_4$ is detonated, reflections from $R_5$ are received by seismometer location $S_2$, which corresponds to seismometer 35 of FIGURE 2. This signal is reproduced on drum 22 by recording head 22g. Two additional signals representing reflections from point $R_5$ are received when explosive charges are subsequently detonated at locations $S_4$ and $S_5$. The six signals are then reproduced and combined with one another by means of the apparatus illustrated in FIGURE 3. Six of the input terminals of mixer circuit 75 are connected to respective heads on the drums 22, 24, and 26 which are associated with the signals representing the reflections from point $R_5$. This procedure is repeated for each of the reflecting points. As previously mentioned, the recording heads associated with each of the drums are moved in unison so as to be representative of selective angularity of path corrections. When the recorded signal represents a maximum, it is known that the desired reflections are superimposed. The angularity of path corrections employed at this time are representative of the depth and dip of the reflecting beds.

In some applications of this invention it has been found that satisfactory results were obtained by combining reflections from a common area rather than from a common point. For example, reflections from points $R_5$ and $R_6$ on bed 20 can be combined in a single composite record. This requires the twelve inputs of mixer circuit 75. While the reproducing circuit of FIGURE 3 has been shown as comprising 12 input terminals, it should be evident that a permanent system with switches can be provided so that the reproducing mixer circuit can be connected to selected reproducing heads of the drums.

As previously mentioned, each seismometer of FIGURE 1 can represent a plurality of seismometer. This is illustrated in FIGURE 5 wherein seismometers 80 to 85 represent seismometer group 30'. The outputs of these six seismometers are summed electrically at point 86. Seismometers 80 to 85 can be on a common line, in a circle, or other conventional arrangement.

In view of the foregoing it should be evident that there is provided in accordance with this invention an improved method of seismic prospecting wherein reflections from a common point or common area of a subterranean formation are combined to produce a strong signal with a minimum amount of noise. By positioning the seismometers on both sides of the shot point and along a common line it is possible to obtain a maximum amount of information from a given number of shot points. This procedure has been found to produce valuable information in areas where satisfactory results could not be obtained heretofore.

While the invention has been described in conjunction with present preferred embodiments, it should be evident that it is not limited thereto.

What is claimed is:

1. The method of seismic surveying comprising establishing a series of equally spaced points in substantially a straight line along the surface of the earth, creating a seismic disturbance at an intermediate one of said points, recording reflections of said disturbance at a plurality of said equally spaced points on each side of said intermediate point, subsequently creating a second seismic disturbance at a second of said intermediate points, recording reflections from said second disturbance at a plurality of said equally spaced points along said line on each side of said second point, and combining the recordings thus made so as to produce a composite record wherein reflections from common regions of subterranean formations are added.

2. The method of claim 1 wherein the recordings are combined with one another a plurality of times with different time relationships with respect to one another so as to determine the time relationship at which a maximum signal is obtained in the composite record which is indicative of reflections from common regions of subterranean formations being added.

3. The method of claim 1, further comprising creating seismic disturbances a plurality of times in succession along said line at points, including the first-mentioned points in addition to said one and said second points, equally spaced from one another; recording reflections from each of said disturbances at a plurality of points along said line on both sides of the corresponding disturbance, the last-mentioned points being spaced from one another the distance adjacent points of disturbance are spaced from one another; and combining the recordings thus made so as to produce a plurality of composite records wherein reflections from common regions of subterranean formations are added.

References Cited in the file of this patent

UNITED STATES PATENTS

| | | |
|---|---|---|
| 2,321,450 | Athy et al. | June 8, 1943 |
| 2,394,990 | Eisler et al. | Feb. 19, 1946 |
| 2,580,636 | Wolf | Jan. 1, 1952 |
| 2,628,689 | Rieber | Feb. 17, 1953 |
| 2,732,906 | Mayne | Jan. 31, 1956 |
| 2,747,172 | Bayhi | May 22, 1956 |
| 2,767,389 | McCollum | Oct. 16, 1956 |
| 2,792,067 | Peterson | May 14, 1957 |
| 2,838,743 | Fredriksson | June 10, 1958 |
| 2,841,777 | Blake et al. | July 1, 1958 |
| 2,879,860 | Tilley | Mar. 31, 1959 |
| 2,888,089 | Piety | May 26, 1959 |